US012367153B2

(12) United States Patent
Gurumurthy et al.

(10) Patent No.: US 12,367,153 B2
(45) Date of Patent: Jul. 22, 2025

(54) MULTI-LEVEL STARVATION WIDGET (71) Applicant: Advanced Micro Devices, Inc., Santa Clara, CA (US)

(72) Inventors: Sankaranarayanan Gurumurthy, Austin, TX (US); Anil Harwani, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 7 days.

(21) Appl. No.: 17/957,479

(22) Filed: Sep. 30, 2022

(65) Prior Publication Data
US 2024/0111684 A1    Apr. 4, 2024

(51) Int. Cl.
*G06F 12/0897* (2016.01)
(52) U.S. Cl.
CPC .... *G06F 12/0897* (2013.01); *G06F 2212/601* (2013.01)
(58) Field of Classification Search
CPC .................................................. G06F 12/0897
See application file for complete search history.

(56) References Cited

U.S. PATENT DOCUMENTS

| | | | |
|---|---|---|---|
| 8,266,383 B1 | 9/2012 | Minkin | |
| 2011/0010501 A1 | 1/2011 | Glover | |
| 2012/0203946 A1* | 8/2012 | Golander | G06F 13/00 710/111 |
| 2016/0350152 A1* | 12/2016 | Gadelrab | G06F 9/4887 |
| 2017/0090955 A1* | 3/2017 | Hsiao | G06F 9/542 |
| 2018/0004670 A1* | 1/2018 | Sudhir | G06F 12/0875 |
| 2018/0260326 A1 | 9/2018 | Alexander | |
| 2020/0167288 A1 | 5/2020 | Olorode | |

FOREIGN PATENT DOCUMENTS

EP    3047380 B1    4/2019

OTHER PUBLICATIONS

International Search Report and Written Opinion received for PCT Application PCT/US2023/075465 mailed Jan. 22, 2024; 8 pages.

* cited by examiner

*Primary Examiner* — Baboucarr Faal
(74) *Attorney, Agent, or Firm* — Greenberg Traurig, LLP (57) ABSTRACT

The disclosed method includes detecting a stalled memory request, for a first level cache within a cache hierarchy of a processor, that includes an outstanding memory request associated with a second level cache within the cache hierarchy that is higher than the first level cache. The method further includes indicating, to the second level cache, that the first level cache is experiencing a starvation issue due to stalled memory requests to enable the second level cache to perform starvation-remediation actions. Various other methods, systems, and computer-readable media are also disclosed.

20 Claims, 5 Drawing Sheets

MULTI-LEVEL STARVATION WIDGET

BACKGROUND

A processor of a computing device often reads and operates on data stored in a main memory of the computing device. The main memory of a computing device is often slower than the processor, such that memory access times may cause bottlenecks for the processor. For example, the processor may make a memory request to the main memory, but because the processor is faster than the main memory, the processor may stall as it waits for the memory request to complete. To alleviate this problem, many processors may incorporate a cache, which is typically a fast memory with access times less than that of the main memory, in part due to being physically located in the processor.

A cache may hold data and/or instructions read from the main memory. The processor may first make memory requests to the cache. If the cache holds the requested data (e.g., a cache hit), the processor may read the data from the cache and avoid the memory access times of the main memory. If the cache does not hold the requested data (e.g., a cache miss), the processor may need to incur the memory access time of the main memory to retrieve the data. The data loaded into the cache may be selected to reduce cache misses, for instance by loading data that has a high likelihood of being requested.

The cache may be designed to prioritize speed such that a size of the cache may be limited. Other considerations, such as die size and power consumption, may further limit the size of the cache. Thus, to further reduce the need to access the main memory on cache misses, some processors may incorporate a second cache that may be larger but slower than the first cache. Upon a cache miss in the first cache, the processor may turn to the second cache before the main memory. Thus, a processor may incorporate multiple caches in a cache hierarchy.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to a multi-level starvation widget for coordinating between levels of a cache hierarchy. As will be explained in greater detail below, implementations of the present disclosure include a widget that detects at least one stalled memory request for a first level cache within a cache hierarchy of a processor. The widget detects that the stalled memory request is associated with a second level cache within the cache hierarchy that is higher than the first level cache and indicates, to the second level cache, that the first level cache is experiencing a starvation issue due to the stalled memory request to enable a widget for the second level cache to perform starvation-remediation actions. Thus, the systems and methods provided herein can allow increased coordination between levels of a cache hierarchy.

In some examples, a copy of the multi-level starvation widget resides at each level of the cache hierarchy. For each level, the widget can detect a starvation issue (e.g., a lack of progress in one or more threads), perform starvation remediation as needed, and report the starvation issue to a higher level or another level.

In one example, a method for multi-level starvation management includes detecting, for a first level cache within a cache hierarchy of a processor, at least one stalled memory request that includes an outstanding memory request associated with a second level cache within the cache hierarchy that is higher than the first level cache. The method also includes indicating, to the second level cache, that the first level cache is experiencing a starvation issue due to stalled memory requests to enable the second level cache to perform starvation-remediation actions.

In some examples, the method also includes performing at least one starvation-remediation action in response to detecting the at least one stalled memory request. In some examples, the at least one starvation-remediation action includes throttling at least one thread associated with the first level cache in response to detecting the at least one stalled memory request. In some examples, throttling the at least one thread further includes throttling the at least one thread in response to detecting there are no outstanding memory requests associated with the second level cache.

In some examples, throttling the at least one thread also includes throttling the at least one thread in response to detecting that the at least one stalled memory request has failed to progress for a threshold period of time. In some examples, the threshold period of time corresponds to a number of processing cycles. In some examples, the method further includes selecting the at least one thread for throttling based on a priority associated with the at least one thread. In some examples, throttling the at least one thread further includes throttling the at least one thread in response to detecting that a third level cache within the cache hierarchy that is lower than the first level cache is experiencing starvation issues due to stalled memory requests. In some examples, detecting that the third level cache is experiencing starvation issues includes receiving, from the third level cache, an indication that the third level cache is experiencing starvation issues. In some examples, detecting the at least one stalled memory request also includes detecting that the third level cache is experiencing starvation issues.

In some examples, the at least one stalled memory request can be detected after throttling the at least one thread and the method further includes initiating a graceful shut down of the first level cache. In some examples, the at least one starvation-remediation action includes logging the at least one stalled memory request.

In another example, a method for multi-level starvation management includes detecting, for a first level cache within a cache hierarchy of a processor, a starvation issue for one or more threads and performing at least one starvation-remediation action in response to detecting the starvation issue. The method also includes detecting, for the first level cache, that the one or more threads includes an outstanding memory request associated with a second level cache within the cache hierarchy that is higher than the first level cache. The method further includes indicating, to the second level cache based on detecting that the one or more threads includes the outstanding memory request associated with the second level cache, that the first level cache is experiencing the starvation issue due to stalled memory requests to enable the second level cache to perform starvation-remediation actions.

In some examples, the at least one starvation-remediation action includes throttling at least one thread associated with the first level cache. In some examples, the method includes selecting the at least one thread for throttling based on a priority associated with the at least one thread. In some examples, throttling the at least one thread further includes throttling the at least one thread in response to receiving, from a third level cache within the cache hierarchy that is lower than the first level cache, an indication that the lower-level cache is experiencing starvation issues. In some examples, the starvation issue can be detected after performing the at least one starvation-remediation action and the method further comprises initiating a graceful shut down of the first level cache.

In one implementation, a system for a multi-level starvation widget includes a physical memory and at least one physical processor comprising a cache and a control circuit. The cache comprises a cache hierarchy including a first level cache and a second level cache higher than the first level cache. The control circuit is configured to detect, for the first level cache, at least one stalled memory request, detect, for the first level cache, that the at least one stalled memory request includes an outstanding memory request associated with the second level cache, and indicate, to the second level cache based on detecting the outstanding memory request associated with the second level cache, that the first level cache is experiencing a starvation issue due to stalled memory requests to enable the higher-level cache to perform starvation-remediation actions.

In some examples, the control circuit is configured to select, in response to detecting the at least one stalled memory request, at least one thread for throttling based on a priority associated with the at least one thread and throttle the selected at least one thread. In some examples, detecting the at least one stalled memory request also includes detecting that a third level cache within the cache hierarchy that is lower than the first level cache is experiencing starvation issues.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-5, detailed descriptions of a multi-level starvation widget for a cache hierarchy. Detailed descriptions of an example system for a multi-level starvation widget will be provided in connection with FIG. 1. Detailed descriptions of a cache hierarchy will be provided in connection with FIGS. 2 and 3. Detailed descriptions of a flow chart for a multi-level starvation widget will be provided in connection with FIG. 4. Detailed descriptions of corresponding methods will also be provided in connection with FIG. 5.

Figure 1:
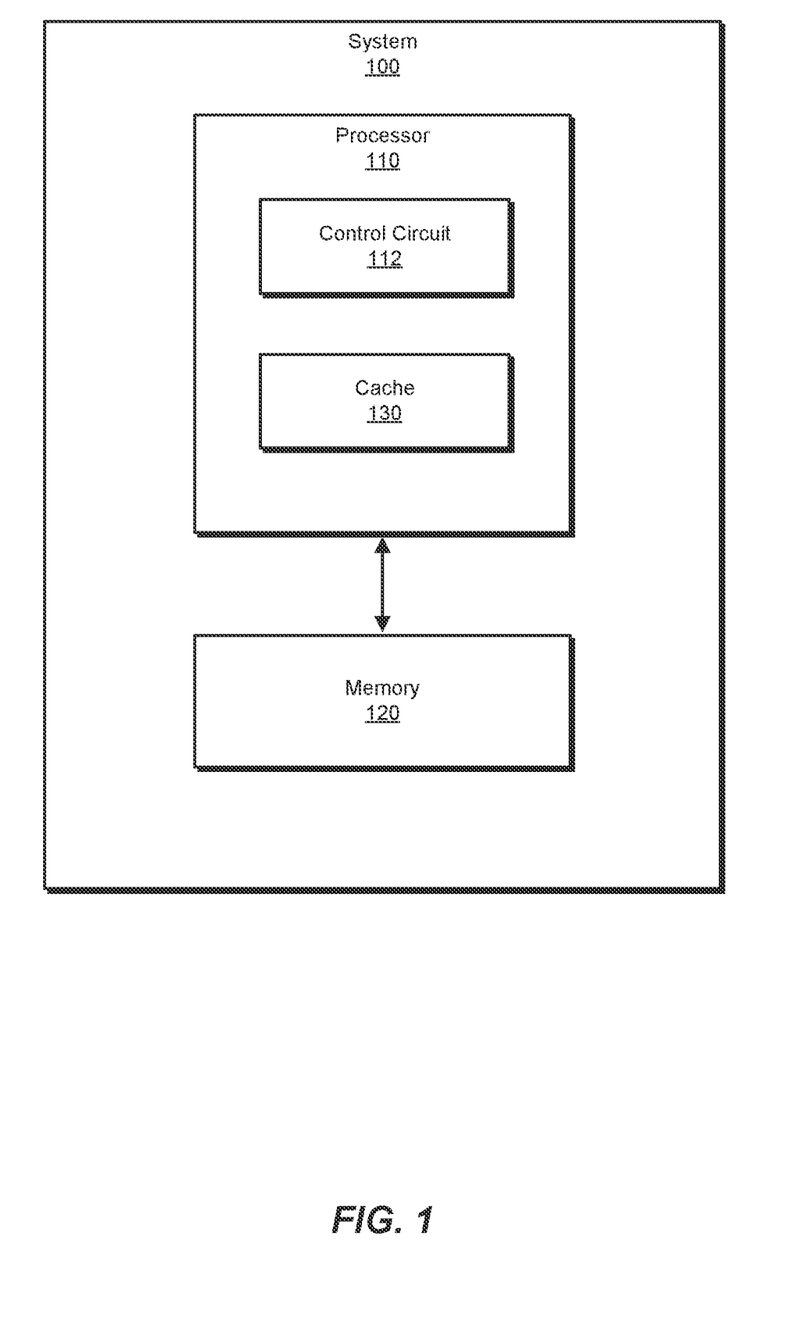
FIG. 1 is a block diagram of an exemplary system for a multi-level starvation widget for a cache hierarchy.

FIG. 1 is a block diagram of an example system 100 for a multi-level starvation widget for a cache hierarchy. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), portions of one or more of the same, variations or combinations of one or more of the same, and/or any other suitable physical processor.

As further illustrated in FIG. 1, processor 110 includes a control circuit 112 and a cache 130. Control circuit 112 corresponds to a multi-level starvation widget, as will be further described herein, and can be implemented with circuitry and/or instructions. Cache 130 corresponds to a cache hierarchy, as will be further described herein. In some examples, portions of control circuit 112 can be integrated within multiple levels of cache 130.

Figure 2:
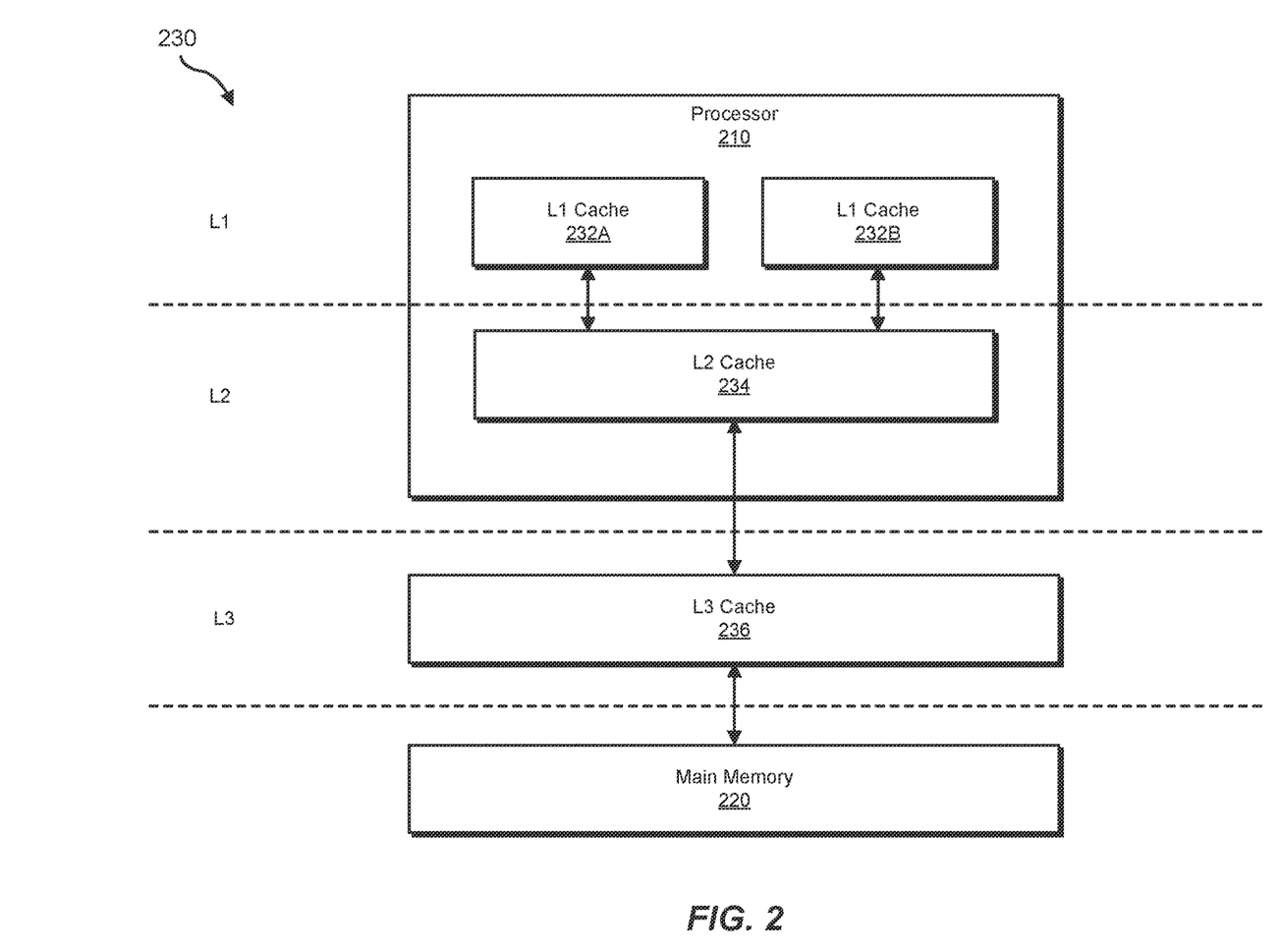
FIG. 2 is a block diagram of an exemplary multi-level cache hierarchy.

FIG. 2 illustrates a diagram of an example cache hierarchy 230, which can correspond to cache 130. Cache hierarchy 230 includes an L1 cache 232A, an L1 cache 232B, an L2 cache 234, an L3 cache 236, and a main memory 220. FIG. 2 further illustrates a processor 210, which can correspond to processor 110.

In cache hierarchy 230, level 1 (L1) corresponds to a lowest level of the hierarchy. L1 caches, such as L1 cache 232A and L1 cache 232B, can be implemented with a fast memory, such as static random-access memory (SRAM). To further prioritize speed, L1 caches can also be integrated with processor 210, for example within a chip core, which can improve latency and throughput. In some examples, as shown in FIG. 2, processor 210 includes multiple L1 caches. L1 caches can be the fastest cache memory but can be limited in size.

L2 caches, such as L2 cache 234, are the next level in the cache hierarchy after L1 caches. Although integrated with processor 210, L2 caches can, in some examples, be located outside of a chip core, but can also be located on the same chip core package. In some cases, L2 caches are not as fast as L1 caches but can be larger. Although not shown in FIG. 2, in some examples, processor 210 can include multiple L2 caches.

L3 caches such as L3 cache 236 can be implemented separately from processor 210, such as being incorporated into a motherboard. L3 caches can be larger than L2 caches but can also be slower. L3 caches can serve as a bridge to the main memory. As such, L3 caches can be faster than the main memory. In some examples, multiple processors and/or cores can share an L3 cache. Although not shown in FIG. 2, in some examples, processor 210 can include multiple L3 caches.

Main memory, such as main memory 220 (which can correspond to memory 120), stores instructions and/or data for processor 210 to read and use. Main memory 220 can be implemented with dynamic random-access memory (DRAM). As described herein, memory access times for main memory 220 can be slow compared to a processing speed (e.g., clock cycles) of processor 210.

FIG. 2 illustrates an example of cache hierarchy 230 having 3 levels. In other examples, cache hierarchy 230 can include fewer or more levels, which can also be integrated with and/or separate from processor 210.

Figure 3:
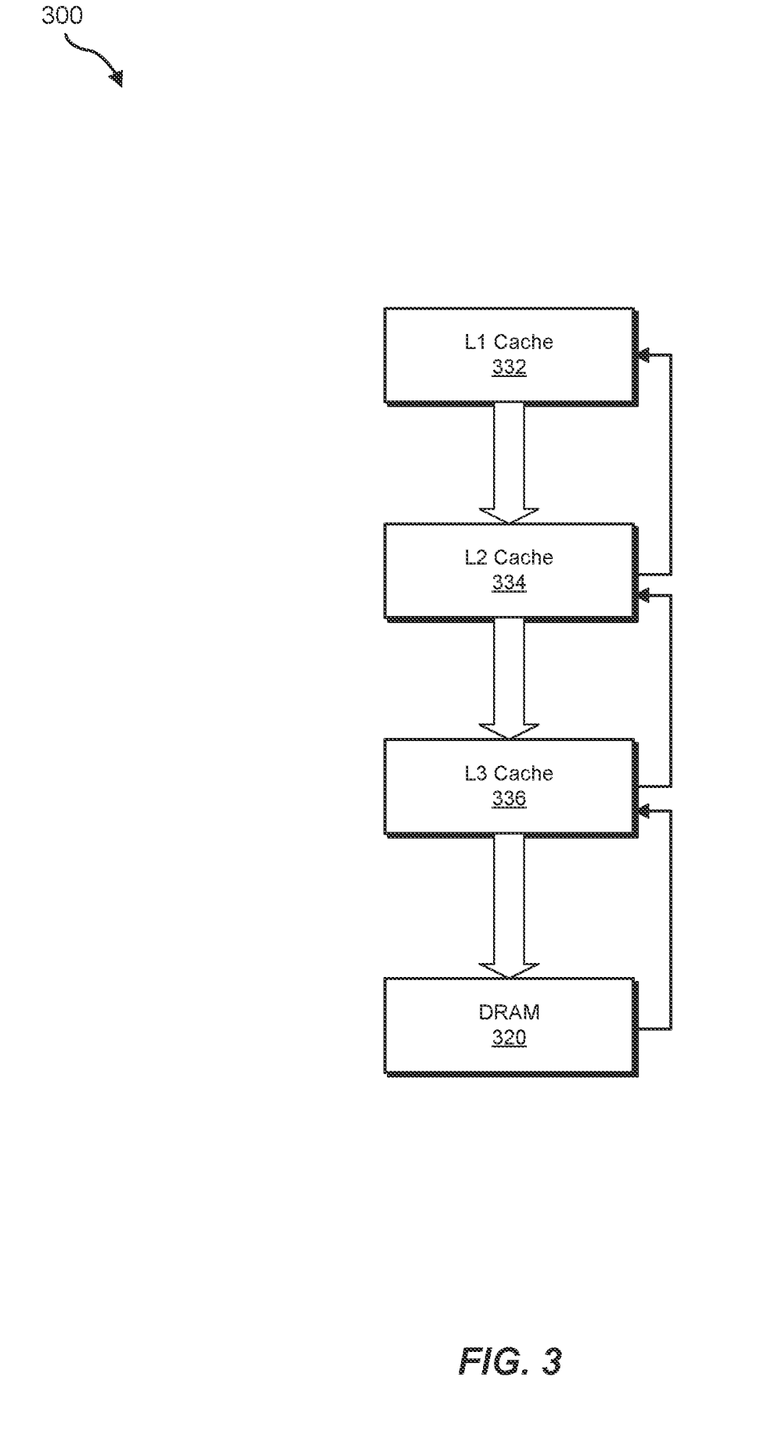
FIG. 3 is a diagram of memory requests in a cache hierarchy.

FIG. 3 illustrates a data flow 300 for a memory request using a cache hierarchy such as cache hierarchy 230. A memory request can include a request for instructions, reading data, or writing data. The examples described herein refer to read requests, although in other examples the systems and methods described herein apply to other types of memory requests. FIG. 3 includes an L1 cache that can correspond to L1 cache 232A and/or L1 cache 232B, an L2 cache 334 that can correspond to L2 cache 234, an L3 cache 336 that can correspond to L3 cache 236, and a DRAM 320 that can correspond to main memory 220.

When a processor such as processor 110 and/or processor 210 initiates a memory request, the processor makes the request to L1 cache 332. In some examples, L1 cache 332 can maintain recently accessed data according to a cache algorithm (which manages cache entries to maximize a cache hit rate) to improve the likelihood of a cache hit. If L1 cache 332 has the requested data, the processor reads the data from L1 cache 332. Upon a cache miss, L1 cache 332 requests the data from the next higher level, L2 cache 334.

L2 cache 334 can be larger than L1 cache 332 to improve a cache hit rate. In some examples, if L2 cache 334 has the requested data, L2 cache 334 provides the requested data to L1 cache 332. L1 cache 332 replaces one of its entries with the requested data according to the cache algorithm. The processor reads the data from L1 cache 332. In other examples, the processor can read the data from L2 cache 334.

If L2 cache 334 does not have the requested data, L2 cache 334 requests the data from the next higher level, L3 cache 336. L3 cache 336 can be larger than L2 cache 334. In some examples, if L3 cache 336 has the requested data, L3 cache 336 provides the requested data to L2 cache 334. L2 cache 334 replaces one of its entries with the requested data according to the cache algorithm. The requested data can propagate down to L1 cache 332 such that the processor can read the data from L1 cache 332. In other examples, the processor can read the data from L3 cache 336.

If L3 cache 336 does not have the requested data, L3 cache 336 requests the data from the next higher level, DRAM 320. Although DRAM 320 may not necessarily be implemented as a cache in the cache hierarchy, in some examples DRAM 320 can be considered a higher-level cache in the cache hierarchy. In some examples, reading from DRAM 320 can correspond to cache misses at every cache level. In some examples, DRAM 320 provides the requested data to L3 cache 336. L3 cache 336 replaces one of its entries with the requested data according to the cache algorithm. The requested data can propagate down to L1 cache 332 such that the processor can read the data from L1 cache 332. In other examples, the processor can read the data directly from DRAM 320.

In some examples, the cache hierarchy can include additional levels, including a storage device (e.g., hard drive, solid state drive, other permanent storage) that can be a higher level than the main memory. In other examples, the cache hierarchy can include fewer levels.

Although each level of the cache hierarchy interfaces with neighboring levels (e.g., a higher level and/or a lower level), each level can normally operate independently. For example, each level manages its own entries as well as its own starvation issues. Starvation can occur when a processing thread is waiting on resources, such as data read from memory. Each level manages its own starvation issues by performing starvation-remediation actions, such as throttling threads or streams that are competing for resources.

However, each level is normally blind to its neighboring levels. In some cases, a lack of progress in a thread of a current-level cache can be due to waiting on an outstanding memory request to a higher-level cache. Although the current-level cache can address its own starvation issues by throttling one of its threads, the current-level cache is limited in addressing a starvation issue caused by the outstanding memory request to the higher-level cache. Alternatively, the current-level cache can normally not be aware that its starvation issue is causing a lack of progress in a lower-level cache.

Figure 4:
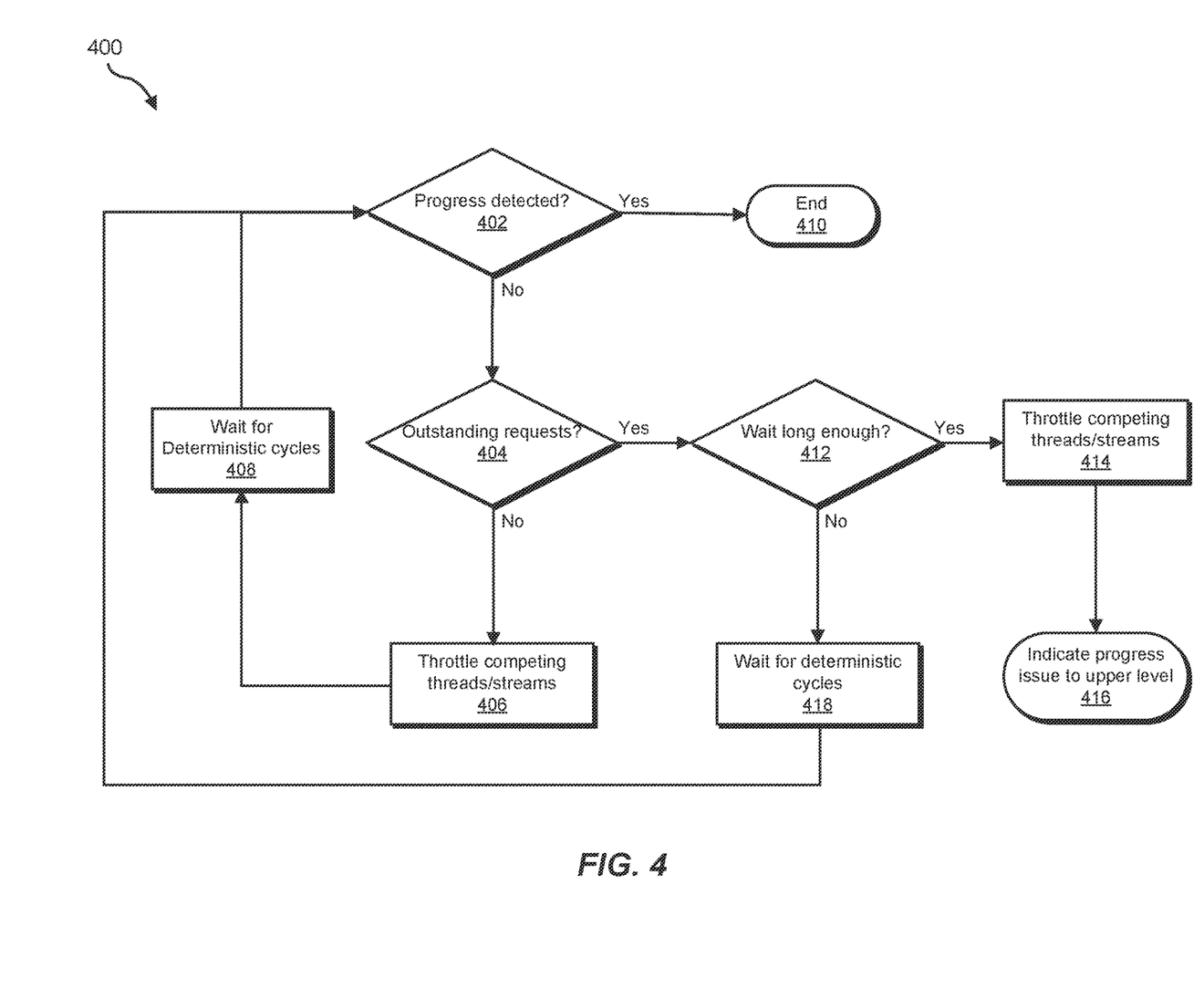
FIG. 4 is a flow diagram of an exemplary process for a multi-level starvation remediation widget for a cache hierarchy.

FIG. 4 illustrates an example flow chart of a basic decision process 400 for a multi-level starvation widget that can correspond to control circuit 112. Process 400 begins at block 402. For a current-level cache, the widget detects whether its threads are sufficiently progressing. If no starvation issue is detected, process 400 continues to block 410, ending a current iteration of process 400. In some examples, detecting progress can further include detecting a progress issue at a lower-level cache.

If at 402 no progress is detected (e.g., a starvation issue or other stall was detected), at block 404, the widget detects if there are any outstanding requests to a higher-level cache. If there are no outstanding requests to the higher-level cache, process 400 continues to block 406. At block 406, the widget throttles competing threads and/or streams. For a stalled thread detected at block 402, the widget selects a thread that is competing for the same resources and throttle the selected thread. In some examples, the stalled thread can correspond to an outstanding memory request that the lower-level cache is waiting on. In some examples, the stalled thread can be competing for a resource that is shared in the current level such that throttling competing threads can allow the resource to be made available to the stalled thread and further allow the stalled thread to make progress. In some examples, the widget can use other factors for selecting a thread to throttle. A quality of service (QoS) scheme identifies priorities of threads (e.g., based on the underlying software services). The widget can select a lower priority thread for throttling, such as a thread having a lower priority than a priority of the stalled thread. After waiting for a number of deterministic cycles (e.g., processing cycles), process 400 returns to block 402 for a next iteration of process 400.

If at 404 the widget detects an outstanding memory request to the higher-level cache, the widget observes a wait time at block 412. In some examples, the widget can use a watchdog timer to observe an amount of time that has passed since a last milestone, such as the last throttling action, the last iteration of process 400, the start of process 400, etc. The widget may have waited for a predetermined period of time, which in some examples corresponds to a number of cycles that can be similar or different than that at block 408. If at block 412 the widget has not waited for the predetermined period of time, the widget proceeds to wait for a predetermined amount of cycles at block 418 and returns to block 402 for a next iteration of process 400. In some examples, waiting before taking a starvation-remediation action can allow the higher-level cache to make progress on the outstanding memory request, which can also resolve the starvation issue at the current level.

However, if at block 412 the widget has already waited for the predetermined period of time, the widget performs a starvation-remediation action at block 414 rather than continue to wait. The widget can select a thread for throttling based on one or more factors as described herein. After performing the starvation-remediation action at block 414, the widget indicates the progress issue to the higher-level cache at block 416. Reporting to the higher-level cache notifies the higher-level cache that the current-level cache is waiting on the higher-level cache.

Figure 5:
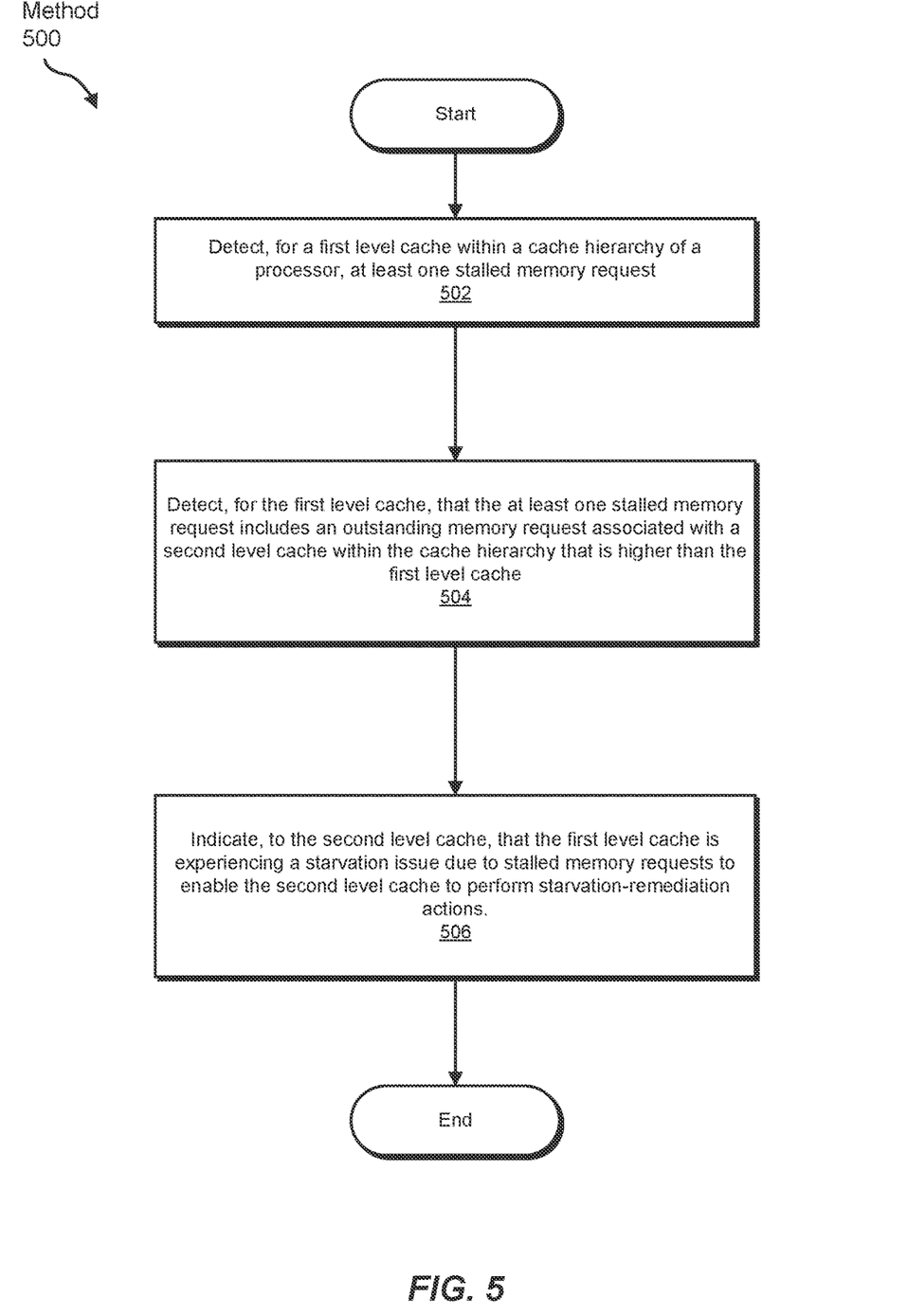
FIG. 5 is a flow diagram of an exemplary method for multi-level starvation remediation for a cache hierarchy.

FIG. 5 is a flow diagram of an exemplary computer-implemented method 500 for multi-level starvation management for a cache hierarchy. The steps shown in FIG. 5 is performed by any suitable computer-executable code and/or computing system, including the system(s) illustrated in FIGS. 1 and/or 2. In one example, each of the steps shown in FIG. 5 can represent an algorithm whose structure includes and/or is represented by multiple sub-steps, examples of which will be provided in greater detail below.

As illustrated in FIG. 5, at step 502 one or more of the systems described herein detects, for a first level cache within a cache hierarchy of a processor, at least one stalled memory request. For example, control circuit 112, for a first level cache (e.g., a current-level cache) within cache 130, detects at least one stalled memory request.

In some implementations, the term "cache hierarchy" or "multi-level cache" refers to a memory architecture that uses various memory devices in a hierarchy that is often arranged based on access speeds. For example, the lowest level of the hierarchy can provide the fastest access speeds and can hold data that is highly requested by a processor. Higher levels, while increasingly slower, can have increased storage capacity. A cache hierarchy is often used by processors to reduce accessing a main memory, which can be much slower. In some examples, the main memory can be considered higher level than the highest cache level.

In some implementations, the term "memory request" refers to any request to a memory device to read, write, and/or update data, and in some cases read instructions. For example, a processor can make a memory request to a main memory for instructions to execute and/or data to operate on. In some examples, the memory request can be propagated up levels of a cache hierarchy until reaching a cache level that has the requested data. A memory request can stall when the requested data is delayed from being returned by the appropriate memory device.

The systems described herein may perform step 502 in a variety of ways. In one example, detecting the at least one stalled memory request further includes detecting that a third level cache within the cache hierarchy that is lower than the first level cache (e.g., a lower-level cache) is experiencing starvation issues. Detecting that the third level cache is experiencing starvation issues includes receiving, from the third level cache, an indication that the third level cache is experiencing starvation issues.

In some examples, control circuit 112 performs at least one starvation-remediation action in response to detecting the at least one stalled memory request. The at least one starvation-remediation action includes throttling at least one thread associated with the first level cache in response to detecting the at least one stalled memory request. In some examples, control circuit 112 selects the at least one thread for throttling based on a priority associated with the at least one thread.

In some examples, control circuit 112 throttles the at least one thread in response to detecting that the third level cache is experiencing starvation issues due to stalled memory requests. Control circuit 112 selects the at least one thread because it competes with a thread associated with the starvation issues of the third level cache.

In some examples, throttling the at least one thread further includes throttling the at least one thread in response to detecting that the at least one stalled memory request has failed to progress for a threshold period of time. The threshold period of time can correspond to a number of processing cycles.

In some examples, control circuit 112 detects the at least one stalled memory request after throttling the at least one thread. Control circuit 112 initiates a graceful shut down of the first level cache. In such examples, the previous starvation-remediation actions may not have addressed starvation issues such that a user may need to intervene (e.g., to investigate the cause of starvation issues, reconfigure the system, etc.). The at least one starvation-remediation action can include logging the at least one stalled memory request to facilitation user intervention.

At step 504 one or more of the systems described herein detects, for the first level cache, that the at least one stalled memory request includes an outstanding memory request associated with a second level cache within the cache hierarchy that is higher than the first level cache. For example, control circuit 112 detects that the stalled memory request includes an outstanding memory request associated with the second level cache (e.g., a higher-level cache). In some cases, the first level cache can be waiting on a memory request made to the second level cache.

The systems described herein may perform step 504 in a variety of ways. In one example, control circuit 112 also performs at least one starvation-remediation action in response to detecting the at least one stalled memory request. The starvation-remediation action can include throttling at least one thread associated with the first level cache in response to detecting the at least one stalled memory request. The throttling can include throttling the at least one thread in response to detecting that the at least one stalled memory request has failed to progress for a threshold period of time. The threshold period of time can in some examples correspond to a number of processing cycles.

In some examples, control circuit 112 selects the at least one thread for throttling based on a priority associated with the at least one thread. In some examples, control circuit 112 initiates a graceful shut down of the first level cache if the at least one stalled memory request is detected after throttling the at least one thread. In such examples, starvation-remediation actions may have been ineffective such that user intervention may be required. Control circuit 112 can log the starvation issues to facilitate user intervention.

At step 506 one or more of the systems described herein indicates, to the second level cache, that the first level cache is experiencing a starvation issue due to stalled memory requests to enable the second level cache to perform starvation-remediation actions. For example, control circuit 112 for the first level cache communicates the starvation issue to control circuit 112 for the second level cache in response to detecting that the stalled memory request includes the outstanding memory request associated with the second level cache.

In some implementations, the term "starvation" refers to a problem when a given thread is unable to access a shared resource. For example, multiple threads may request a particular resource. Although the resource can be managed to allow each thread access, in some scenarios a certain thread may be continuously bypassed (e.g., by higher priority threads). Alternatively, a greedy thread can make the resource unavailable for a long period of time.

In some implementations, the term "starvation-remediation action" refers to actions that can improve starvation issues. Examples of starvation-remediation actions include, without limitation, throttling threads (e.g., a greedy thread or other competing thread), terminating threads, etc.

The systems described herein may perform step 506 in a variety of ways. In one example, control circuit 112 identifies the outstanding memory request to the second level cache to enable the second level cache (e.g., the corresponding control circuit 112 for the higher-level cache) to perform starvation-remediation actions that account for the starvation issues of the first level cache.

As described herein, the present disclosure provides a widget that helps remediate starvation across multiple levels of a cache hierarchy. In some examples, each level of the cache hierarchy has its own copy of the widget. At a given level of the cache hierarchy, the widget can detect a progress problem. If the widget detects an outstanding request to an upper level for a particular stream, and if the current level is waiting on the upper level, the progress problem may not be at the current level. Because the current level does not have any control over the upper level, the widget communicates this issue to the upper level.

If the progress problem is at the current level (e.g., there is no outstanding request to the upper level), the problem can be more critical. In this situation, the widget can first throttle a competing stream at the current level. The competing stream can be a stream that may be potentially causing another stream to stall. The widget throttles the competing stream before communicating with the upper level, which can also alleviate the upper level's management of streams. In some cases, the widget waits for a sufficient time before throttling. For instance, by communicating with the upper level and waiting, the upper level can take actions that may improve the current level as well.

The widget throttles a stream by sending an indication to not dispatch new instructions for N number of cycles. For example, the current level can have a limited number of tokens (such as 48), for instructions. The widget can restrict the tokens to a lower number to throttle a stream. The widget also selects streams for throttling based on a QoS mechanism. The QoS mechanism can be implemented by the underlying software to give different priorities to its streams. The widget can select a lower priority stream based on the QoS mechanism.

After throttling the competing stream, the widget sees if the progress problem has been addressed. In some cases, if there continues to be a progress problem after throttling, the widget can escalate its remediation attempts. For example, the widget can continue to throttle other streams. In some cases, the widget detects that throttling has not been effective, and will instead initiate a graceful shut down. The widget can further log information relating to the progress problem such that if a user is manually intervening, the user can access the log.

As detailed above, the computing devices and systems described and/or illustrated herein broadly represent any type or form of computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SOCs), portions of one or more of the same, variations or combinations of one or more of the same, or any other suitable physical processor.

Although illustrated as separate elements, the modules described and/or illustrated herein can represent portions of a single module or application. In addition, in certain implementations one or more of these modules can represent one or more software applications or programs that, when executed by a computing device, cause the computing device to perform one or more tasks. For example, one or more of the modules described and/or illustrated herein represent modules stored and configured to run on one or more of the computing devices or systems described and/or illustrated herein. In some implementations, a module can be implemented as a circuit or circuitry. One or more of these modules can also represent all or portions of one or more special-purpose computers configured to perform one or more tasks.

In addition, one or more of the modules described herein transforms data, physical devices, and/or representations of physical devices from one form to another. For example, one or more of the modules recited herein receives data to be transformed, transforms the data, and stores the result of the transformation to manage a cache. Additionally or alternatively, one or more of the modules recited herein transforms a processor, volatile memory, non-volatile memory, and/or any other portion of a physical computing device from one form to another by executing on the computing device, storing data on the computing device, and/or otherwise interacting with the computing device.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    detecting, by a first control circuit associated with a first level cache within a cache hierarchy of a processor, at least one stalled memory request for the first level cache that includes an outstanding memory request that is waiting on a second level cache within the cache hierarchy that is higher than the first level cache; and
    communicating, by the first control circuit to a second control circuit associated with the second level cache, that the first level cache is experiencing a starvation issue due to the outstanding memory request having to wait on the second level cache and to enable the second level cache to perform starvation-remediation actions.

2. The method of claim 1, further comprising performing at least one starvation-remediation action in response to detecting the at least one stalled memory request.

3. The method of claim 2, wherein the at least one starvation-remediation action comprises throttling at least one thread associated with the first level cache in response to detecting the at least one stalled memory request.

4. The method of claim 3, wherein throttling the at least one thread further comprises throttling the at least one thread in response to detecting there are no outstanding memory requests associated with the first level cache.

5. The method of claim 3, wherein throttling the at least one thread further comprises throttling the at least one thread in response to detecting that the at least one stalled memory request has failed to progress for a threshold period of time.

6. The method of claim 5, wherein the threshold period of time corresponds to a number of processing cycles.

7. The method of claim 3, further comprising selecting the at least one thread for throttling based on a priority associated with the at least one thread.

8. The method of claim 3, wherein throttling the at least one thread further comprises throttling the at least one thread in response to detecting that a third level cache within the cache hierarchy that is lower than the first level cache is experiencing starvation issues due to stalled memory requests.

9. The method of claim 8, wherein detecting that the third level cache is experiencing starvation issues comprises receiving, from the third level cache, an indication that the third level cache is experiencing starvation issues.

10. The method of claim 8, wherein detecting the at least one stalled memory request further comprises detecting that the third level cache is experiencing starvation issues.

11. The method of claim 3, wherein the at least one stalled memory request is detected after throttling the at least one thread and the method further comprises initiating a shut down of the first level cache.

12. The method of claim 2, wherein the at least one starvation-remediation action comprises logging the at least one stalled memory request.

13. A method comprising:
    detecting, by a first control circuit associated with a first level cache within a cache hierarchy of a processor, a starvation issue for one or more threads for the first level cache;
    performing at least one starvation-remediation action in response to detecting the starvation issue;
    detecting, by the first control circuit for the first level cache, that the one or more threads includes an outstanding memory request that is waiting on a second level cache within the cache hierarchy that is higher than the first level cache; and
    communicating, by the first control circuit to a second control circuit associated with the second level cache based on detecting that the one or more threads includes the outstanding memory request that is waiting on the second level cache, that the first level cache is experiencing the starvation issue due to the outstanding memory request having to wait on the second level cache to enable the second level cache to perform starvation-remediation actions.

14. The method of claim 13, wherein the at least one starvation-remediation action comprises throttling at least one thread associated with the first level cache.

15. The method of claim 14, further comprising selecting the at least one thread for throttling based on a priority associated with the at least one thread.

16. The method of claim 14, wherein throttling the at least one thread further comprises throttling the at least one thread in response to receiving, from a third level cache within the cache hierarchy that is lower than the first level cache, an indication that the third level cache is experiencing starvation issues.

17. The method of claim 13, wherein the starvation issue is detected after performing the at least one starvation-remediation action and the method further comprises initiating a shut down of the first level cache.

18. A system comprising:
a physical memory; and
at least one physical processor comprising:
- a cache hierarchy comprising:
  - a first level cache associated with a first control circuit; and
  - a second level cache higher than the first level cache in the cache hierarchy and associated with a second control circuit;
- wherein the first a control circuit is configured to:
  - detect, for the first level cache, at least one stalled memory request;
  - detect, for the first level cache, that the at least one stalled memory request includes an outstanding memory request that is waiting on the second level cache; and
  - communicate, to the second control circuit associated with the second level cache, that the first level cache is experiencing a starvation issue due to the outstanding memory request having to wait on the second level cache to enable the second level cache to perform starvation-remediation actions.

19. The system of claim 18, wherein the first control circuit is configured to select, in response to detecting the at least one stalled memory request, at least one thread for throttling based on a priority associated with the at least one thread and throttle the selected at least one thread.

20. The system of claim 18, wherein detecting the at least one stalled memory request further comprises detecting that a third level cache within the cache hierarchy that is lower than the first level cache is experiencing starvation issues.

\* \* \* \* \*